May 27, 1947. L. A. DE ROSA 2,421,018
RADIO DETECTION SYSTEM
Filed Feb. 27, 1943

INVENTOR.
LOUIS A. DeROSA
BY
*Perry P. Lantry*
ATTORNEY

Patented May 27, 1947

2,421,018

UNITED STATES PATENT OFFICE 2,421,018

RADIO DETECTION SYSTEM

Louis A. de Rosa, Staten Island, N. Y., assignor to Federal Telephone and Radio Corporation, Newark, N. J., a corporation of Delaware Application February 27, 1943, Serial No. 477,354

8 Claims. (Cl. 250—1.66)

This invention relates to radio detection systems and more particularly to short range detection systems useful on aircraft for detecting and tracking down enemy aircraft.

In aerial navigation particularly in combat areas during war time under conditions where enemy aircraft is not easily observed by the pilot because of distance, clouds, fog or the blackness of night or because the enemy craft is "in the sun," great need exists for some form of compact, light weight, radio detection apparatus. Such detection apparatus is also desirable in peace time flying to avoid collision with other aircraft and for detection of obstacles such as mountain peaks.

It is an object of my invention to provide a radio detection system to satisfy the foregoing needs.

Another object of my invention is to provide a method and means for detecting the nearest obstacle to an aircraft in flight.

Still another object of the invention is to provide a method and means for detecting the presence and the distance to other aircraft and obstacles within a given detection range of an aircraft equipped with detection apparatus according to my invention.

The detection and measurement of the distances to obstacles from an aircraft equipped with detection apparatus according to my invention includes means for transmitting recurring impulses and means for detecting echo pulses produced by the obstacles in response to the transmitted impulses. The apparatus also includes a circuit in which the flow of current is controlled by means responsive to the transmission of impulses on the one hand and the echo pulses on the other hand. This control is effected by producing a first series of control pulses in response to the transmission of impulses and a second series of control pulses in response to echo pulses received from the nearest or some other more distant obstacle.

By the expression "control pulses" I have reference to pulse energy such as produced in the anode circuit of an amplifier in response to pulses applied to the grid of the tube. Thus, the control pulses corresponding to a series of echo pulses are in effect an amplification of the echo pulses.

The control of the current flow condition of the circuit is such that the current flow is initiated by one series of the control pulses and discontinued by the other series of control pulses. This current control condition may be produced in several different ways. One method would be the use of a multivibrator which may be triggered from one state of operation to a second in response to control pulses synchronized with the transmission of impulses and triggered back from the second state of operation to the first by the control pulses synchronized with the echo pulses. Another method of current control may comprise the use of one or two gas-discharge tubes wherein one series of control pulses initiate the firing of a gas-discharge tube and the other series of pulses controls the extinction of the tube. Still further arrangements might comprise a gas-discharge tube and a vacuum tube arranged for control of current flow in a circuit associated with the tubes.

The current flow conditions of the circuit are integrated by suitable metering means so as to provide an indication of the time interval represented by one of the current flow conditions.

Where the transmitter pulses control the initiation of current flow, I preferably provide an arrangement where the initiation of current flow controls a blocking device associated with the receiver. That is to say, the echo pulses are normally blocked by this blocking device from effecting their controlling function on the current flow condition of the circuit. Thus, when the current flow is initiated, this normal blocking is removed permitting the first echo pulse received to change the current flow condition of the circuit such as discontinuing the flow. This provides for the detection of the nearest obstacle to the aircraft in flight.

In order to detect and determine the distance to craft located a distance greater than the nearest craft, I provide the unblocking connection of the blocking device with a delay device adjustable to maintain the normal blocking function until after the first or a predetermined number of echo pulses have been received following the transmission of an impulse.

The range of the detection system for use on aircraft is determined largely by the height of the aircraft above ground. When an aircraft is flying at an altitude of say 20,000 feet or thereabouts, the effective range would be approximately 20,000 feet, that is, before ground reflections would interfere.

Another desirable feature of my invention is the fact that the transmission of impulses may be made at a low repetition rate. This provides an advantage over the higher repetition rates of the usual detection systems heretofore proposed because of the huge peak-to-average power obtained by the transmission of the low repetition rate. Thus, the average power for my system may be relatively small thereby not unduly taxing the power of the aircraft.

For a further understanding of the invention, reference may be had to the following detailed description to be read in connection with the accompanying drawings, in which.

Figure 1:
Fig. 1 is a diagrammatical illustration of an aircraft equipped with a radio detection system according to my invention shown with two other aircraft within detection range of the system.
Figure 2:
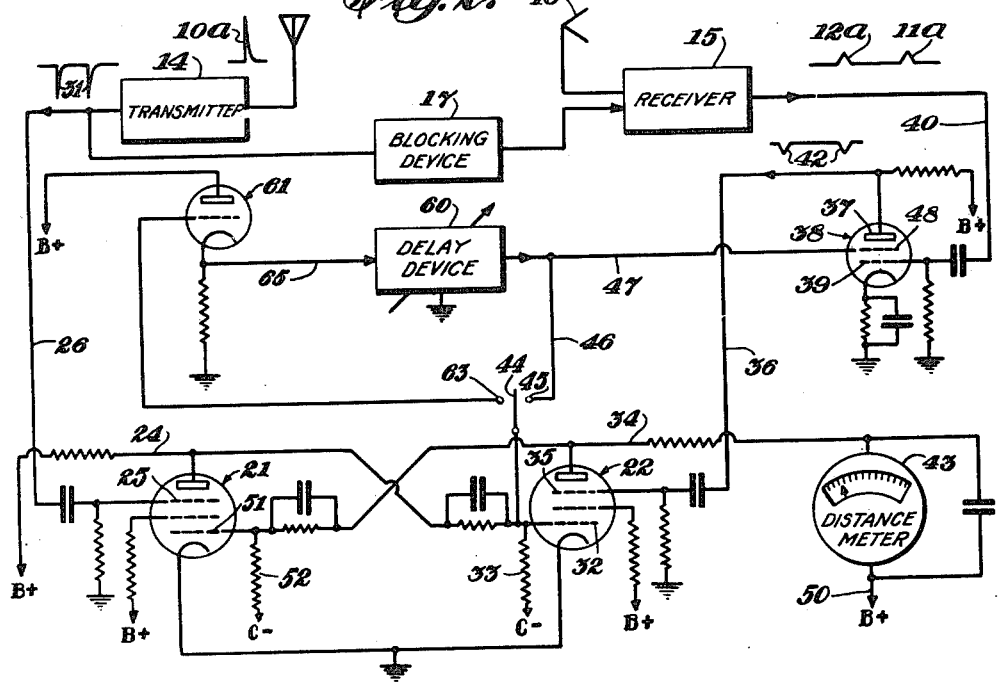
Fig. 2 is a schematic wiring and block diagram of the radio detection system.

Referring to the drawings, the aircraft 10 (Fig. 1) is provided with a radio detection system according to an embodiment of my invention illustrated in Fig. 2. The system is provided with a transmitter 14 adapted to transmit impulses 10a at a given repetition rate as indicated in curve a of Fig. 3. A receiver 15 is provided together with an antenna system 16 which preferably is directive in character to receive echo pulses 11a and 12a (Fig. 3) from obstacles or craft such as the aircraft 11 and 12 of Fig. 1. The usual receiver blocking device 17 is used so that the receiver will not be subjected to the transmission of the strong impulses 10a.

For purposes of illustration I have shown the system of Fig. 2 provided with a multivibrator comprising vacuum tubes 21 and 22. The multivibrator circuit is known and need not be described in detail except to point out that the plate circuit 24 of the tube 21 is arranged to normally conduct a flow of current. Connected to the suppressor grid 25 of the tube 21 is a lead 26 from the transmitter 14 over which control pulses 31, preferably negative, are applied to the suppressor grid. These pulses 31 each operates to interrupt the current flow through the plate circuit 24 of the tube 21.

While current is flowing in the tube 21, the tube 22 is non-conducting. This non-conducting state which is indicated at 22a (curve b, Fig. 3) is produced by a negative bias applied on the grid 32 from a source 33. When conduction ceases in the tube 21, the positive potential applied to the plate circuit 24 from the source B+ imposes a corresponding positive potential on the grid 32 thereby reducing the negative bias thereon to such an extent as to cause the tube 22 to conduct, thereby producing a flow of current 22b through the plate circuit 34 thereof.

The suppressor grid 35 of the tube 22 is connected by a connection 36 to the plate 37 of a gate tube 38. A grid 39 of the gate tube is connected through a lead 40 to the output of the receiver 15. The echo pulses 11a, 12a etc., are received through the lead 40 and during a proper biasing period of the tube 38 will translate these pulses into control pulses 42 which in turn are applied to the suppressor grid 35 of the tube 22.

Figure 3:
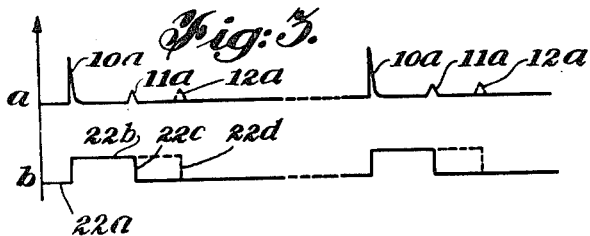
Fig. 3 is a graphical illustration of the operating principles of the system.

The gate tube 38 is normally blocked against the passage of pulses from the receiver 15. This normal blocking exists during the conduction of current in the plate circuit of the tube 21. During conduction of the tube 21, the negative bias on the grid 32 is maximum and this negative bias is normally applied through contacts 44, 45 through connections 46 and 47 to a grid 48 of the gate tube 38. This negative bias on the grid 48 is sufficient to prevent the positive echo pulses 11a, 12a etc. from producing conduction in the tube 38. This normal blocking function of the tube 38 is discontinued when a pulse 31 triggers the multivibrator from a current conducting condition in tube 21 to a current conducting condition in tube 22. The positive bias produced on the grid 32 in response to this triggering operation reduces the negative bias on the grid 48 of the gate tube, thereby permitting translation of the first echo pulse 11a into a control pulse 42. When the first control pulse 42 corresponding to the echo pulse 11a is applied to the grid 35 of the tube 22 the current conduction of tube 22 is interrupted as indicated at 22c (Fig. 3). This interruption of current flow in the plate circuit 34 permits application of a positive potential B+ from the source 50 for application to the grid 51 of the tube 21. This in turn reduces the negative potential applied from the source 52 thereby returning the tube 21 to a state of conduction. This return of conduction in the tube 21, however, removes the positive potential applied over connection 24 to the grid 32 so that the negative potential from the source 33 again increases thereby blocking both the tube 22 and the gate tube 38.

For integration of the conduction period of tube 22, the plate circuit 34 thereof is provided with a meter 43 suitably calibrated, preferably in distance so as to indicate the distance to the obstacle whose echo pulse interrupts conduction of tube 22. Assuming that the aircraft 11 is the nearest craft to the craft 10, the pulse 11a will be the first echo pulse to be received by the gate tube 38. Since the control pulse 42 corresponding to the pulse 11a discontinues the conduction of the tube 22, a current flow ending at 22c will occur after the transmission of each impulse. These current flows are integrated by the meter 43 giving an indication of the distance to the craft 11.

If the apparatus is used only for indicating the nearest obstacle, the gate tube 38 may be dispensed with. In that case, the connection 36 would lead directly to the output of the receiver 15. The receiver 15, however, would then be arranged to translate the positive echo pulses into negative pulses for controlling operation of the tube 22. It will be understood, of course, that after the first negative pulse is applied to the grid 35 of the tube 22 subsequent negative echo pulses will have no effect until the multivibrator has again been triggered by a control pulse 31.

The utility of the gate tube 38, however, enables the operator of the system to obtain indication of craft and other obstacles at distances greater than the distance to the nearest craft. This detection of craft further away than the nearest craft is obtained by use of an adjustable delay device 60 which is connected through an isolating tube 61 to a contact 63. When the movable contact 44 is switched over to contact 63, the delay device 60 will retard according to the adjustment thereof the change in potential on the grid 48. Assuming that this change is from a high negative bias to a lesser negative or positive bias, this change will produce conduction in the tube 61 and the cathode follower connection 65 applies the change in potential to the input of the delay device 60 where the change is retarded for a selected time interval and then applied to the grid 48 of the gate tube. Thus, if after having detected and observed the distance to the craft 11, it is desirable to determine if any other craft is present beyond the distance of the craft 11, the delay device 60 will be adjusted to the distance of the craft 11 as indicated by the meter 43. This adjustment maintains the gate tube 38 blocked to the reception of echo pulses until after the pulse 11a has been received. The tube 38 is then unblocked and is receptive to the first pulse occurring thereafter such as the pulse 12a. The pulse 12a causes conduction in the tube 38 to produce a control pulse 42 which interrupts conduction in the plate circuit of the tube 22 as indicated at 22d. This blocking function of the adjustable delay device 60 may be further adjusted for blocking both of the pulses 11a and 12a so as to detect any aircraft at distances greater than the distance to the craft 12 etc. Thus, any number of echo pulses may be blocked for scanning the complete detection range of the system.

While I have described the principles of my invention in connection with a specific embodiment, it will be understood that the embodiment herein shown and described is given by way of example only and not as a limitation on the scope of the invention as set forth in the objects and the appended claims.

I claim:

1. A method of measuring the distance to an obstacle comprising transmitting impulses, detecting echo pulses produced by obstacles in response to said impulses, producing a first control pulse in synchronism with the transmission of each impulse, producing a second control pulse in synchronism with the echo pulses reflected from a particular obstacle, applying said first control pulse to initiate a flow of current, applying said second control pulse to discontinue said current flow, normally blocking the control function exercised by control pulses produced in synchronism with echo pulses, and applying the current flow initiated by said first control pulse to render the normal blocking operation inoperative.

2. A method of measuring the distance to an obstacle comprising transmitting impulses, detecting echo pulses produced by obstacles in response to said impulses, producing a first control pulse in synchronism with the transmission of each impulse, producing a second control pulse in synchronism with the echo pulses reflected from a particular obstacle, applying said first control pulse to initiate a flow of current, applying said second control pulse to discontinue said current flow, normally blocking the control function exercised by control pulses produced in synchronism with echo pulses, and unblocking said control function after a given time interval following initiation of said flow of current to prevent control of said current flow by echo pulses detected during said time interval, thereby detecting the presence of the nearest obstacle located within the range of the system at a distance greater than the distance corresponding to said given time interval.

3. A system for measuring the distance to an obstacle comprising means to transmit impulses, a receiver for detecting echo pulses produced by obstacles in response to said impulses, means to produce a first series of control pulses in synchronism with the transmission of said impulses, means to produce a second series of control pulses in synchronism with the echo pulses received from a particular obstacle, a circuit, means responsive to the first series of control pulses to initiate a flow of current in said circuit, means responsive to the second series of pulses to discontinue said current flow, means to normally block the control function of said second series of control pulses, means to produce a control potential in response to the occurrence of said current flow to unblock said control function, and means to retard said control potential for a time interval such that control pulses corresponding to said particular obstacle are rendered inoperative, thereby enabling the system to detect the presence of the next nearest obstacle located within the range of the system.

4. A system for measuring the distance to an obstacle comprising means to transmit impulses, a receiver for detecting echo pulses produced by obstacles in response to said impulses, means to produce a first series of control pulses in synchronism with the transmission of said impulses, means to produce a second series of control pulses in synchronism with the echo pulses received from a particular obstacle, a circuit, means responsive to the first series of control pulses to initiate a flow of current in said circuit, means responsive to the second series of pulses to discontinue said current flow, means to normally block the control function of said second series of control pulses, and means operative substantially simultaneously with the initiation of a current flow in said circuit to unblock said control function.

5. A system for measuring the distance to an obstacle comprising means to transmit impulses, a receiver to detect echo pulses produced by obstacles in response to said impulses, a multivibrator, means responsive to the transmission of an impulse to trigger said multivibrator from a current flowing condition in one circuit thereof to a current flowing condition in a second circuit thereof, a gate tube having two grids, means connecting the output of said receiver to one of said grids, an adjustable delay device, means connecting the said first circuit to the input side of said delay device, and means connecting the output side of said delay device to the other of said grids, and means connecting the plate circuit of said gate tube to the said second circuit of said multivibrator.

6. A system for measuring the distance to an obstacle comprising means to transmit impulses, a receiver to detect echo pulses produced by obstacles in response to said impulses, a multivibrator, means responsive to the transmission of an impulse to trigger said multivibrator from a current flowing condition in one circuit thereof to a current flowing condition in a second circuit thereof, means responsive to the first echo pulse detected by said receiver to trigger back said multivibrator from a current flowing condition in said second circuit to a current flowing condition in said first circuit, means to integrate the current flowing condition in said second circuit thereby obtaining a distance indication corresponding to the interval of time between the transmission of one of said impulses and the reception of the corresponding echo pulse from the nearest obstacle, means to normally block echo pulse energy from said echo responsive means, and means operative substantially simultaneously with the initiation of current flow in said second circuit to unblock said blocking means.

7. A system for measuring distances to impulse reflecting obtacles comprising means for transmitting an impulse, a measuring device, means responsive to transmission of said impulse to produce a flow of current in said measuring device, control means for terminating said flow of current in response to reception of a reflection of said impulse, and means for rendering said control means inactive for a desired time interval following transmission of said impulse.

8. A time measuring apparatus comprising means for generating a radiation pulse, a time measuring device, means responsive to generation of said radiation pulse for initiating operation of a measuring device, means for terminating operation of said measuring device on application thereto of a second pulse, and means for rendering inactive said means last mentioned for a predetermined time interval after generation of said radiation pulse.

LOUIS A. DE ROSA.

REFERENCES CITED

The following references are of record in the file of this patent:

FOREIGN PATENTS

| Number | Country | Date |
|---|---|---|
| 497,147 | Great Britain | Dec. 9, 1938 |
| 113,233 | Australia | June 2, 1941 |